US 6,612,836 B1

(12) United States Patent
Engelbrecht

(10) Patent No.: US 6,612,836 B1
(45) Date of Patent: Sep. 2, 2003

(54) SINGLE-USE IMPRESSION TRAY HAVING ADHESIVE COATINGS

(75) Inventor: Jürgen Engelbrecht, Elmshorn (DE)

(73) Assignee: S & C Polymer, Silicon- und Composite-Spezialitation GmbH, Elmshorn (DE)

(*) Notice: Subject to any disclaimer, the term of this patent is extended or adjusted under 35 U.S.C. 154(b) by 0 days.

(21) Appl. No.: 09/455,646

(22) Filed: Dec. 7, 1999

(30) Foreign Application Priority Data

Feb. 9, 1999 (DE) .......................................... 199 05 224
Apr. 7, 1999 (DE) .......................................... 199 15 492
May 12, 1999 (DE) .......................................... 199 21 948

(51) Int. Cl.$^7$ .................................................. A61C 9/00
(52) U.S. Cl. .............................. 433/37; 433/48; 528/15; 528/25; 528/31
(58) Field of Search ........................ 433/37, 48; 528/31, 528/15, 25

(56) References Cited

U.S. PATENT DOCUMENTS

| | | | | | |
|---|---|---|---|---|---|
| 4,456,647 | A | * | 6/1984 | Schnofelder et al. | ........ 428/216 |
| 4,780,260 | A | * | 10/1988 | Yoshida et al. | ............. 264/255 |
| 4,985,277 | A | * | 1/1991 | Shimizu et al. | ............. 427/180 |
| 5,145,886 | A | * | 9/1992 | Oxman et al. | ................. 522/66 |
| 6,251,966 | B1 | * | 6/2001 | Fry et al. | ..................... 523/109 |

* cited by examiner

Primary Examiner—Margaret G. Moore
(74) Attorney, Agent, or Firm—Frommer Lawrence & Haug, LLP; Ronald R. Santucci

(57) ABSTRACT

The present invention relates to a molding that has a layer of copolymers that are crosslinkable by means of addition or condensation reactions and, optionally, thereon, a layer of silicone that is crosslinkable by means of addition or condensation reactions.

22 Claims, No Drawings

SINGLE-USE IMPRESSION TRAY HAVING ADHESIVE COATINGS

CROSS REFERENCE TO RELATED APPLICATIONS

This application claims the benefit of priority to DE 199 05 224.7, filed Feb. 9, 1999, DE 199 15 492.2, filed Apr. 7, 1999 and DE 199 21 948.6, filed May 12, 1999.

TECHNICAL FIELD

The present invention relates generally to a molding that has a) a layer of copolymers that are crosslinkable by means of addition or condensation reactions and, optionally, b) thereon, a layer of silicone that is crosslinkable by means of addition or condensation reactions.

More particularly, the invention relates to moldings that are coated with at least one adhesion promoter and, optionally, silicone and that bond readily with a silicone that is curing. The invention relates more especially to ready-to-use single-use dental impression trays having adhesive coatings that, when a cast is taken, produce an intimate bond between a silicone impression composition and the impression tray even without using impression tray adhesives or mechanical retaining means in the impression tray. Impression trays of that kind can be charged with impression compositions at the dentist's directly, without further pre-treatment, and placed in the mouth. They bond intimately with the silicone impression composition; the resulting silicone impressions are firmly bonded to the impression trays.

BACKGROUND OF THE INVENTION

For taking impressions in the mouth with the aid of flexible impression compositions it is customary to use impression trays, so that the impression composition can be introduced into the mouth effectively and, after the impression composition has cured, the cast can be removed from the mouth, as far as possible without deformation. For that purpose, impression trays must have a very high degree of dimensional stability. Generally, they are pre-formed components made of hard plastics or of metal, having different sizes and geometries.

The bond between the impression trays and the impression compositions poses a major problem. Silicones do not by themselves adhere to plastics or metal; rather, they act as separating agents. In order to enable the silicone impression compositions, which in other respects are very suitable, to be reliably used nonetheless, attempts were firstly made to hold the impression composition in a stable manner on the tray and to prevent it from lifting off when the cast is taken out of the mouth, with the aid of mechanical retaining means, such as holes, coarse mesh plate parts, undercut ribs, bent-round tray rims etc., that is to say by mechanical means. Attempts were also made to improve the adhesion of the silicone compositions to the trays by molecular/mechanical means with the aid of solutions of viscous polymers (adhesives). Generally, such impression tray adhesives are solutions of only partially crosslinked silicones in volatile solvents. Nevertheless, no chemical reaction occurs, either between the silicone impression composition and the tray adhesive or between the tray adhesive and the impression tray.

However, all such measures for better adhesion of the silicone impression compositions to the impression trays have disadvantages. Trays having efficacious, relatively large mechanical retaining means generally consist of hard metal, are expensive and therefore can be used economically only in the form of multiple-use impression trays. Removing the silicone impression compositions after each impression is, however, laborious and time-consuming.

Trays that can be used inexpensively in the form of single-use impression trays, such as, for example, trays made of thermoplastics or aluminium, cannot, for reasons of stability, have quite as many retaining holes or undercuts. Their retaining characteristics are therefore inadequate.

The commercially available viscous adhesives have an action that is merely auxiliary: when subjected to relatively strong tensile forces, the silicone impression composition lifts off, with deformation; the viscous adhesive comes away, with many drawn-out threads being formed; and the dental cast is deformed, resulting in defective fittings.

DE 42 28 538 A1 describes surface-conditioned impression trays that, even after several impressions, are said to ensure unchanged adhesion of the impression composition. The impression trays are treated with a bonding layer of a solidified phenolic resin-methacrylate dispersion; adhesive strengths of 0.5 Mpa are mentioned. A secure bond is not possible using systems of that kind.

SUMMARY OF THE INVENTION

The invention provides moldings that bond very firmly to silicone compositions customarily used as impression compositions. The invention especially provides an impression tray to which dental impression compositions irreversibly adhere especially after a cast is taken even without the use of viscous impression tray adhesives or mechanical retaining means.

In addition, the invention provides moldings that have a layer of copolymers that are crosslinkable by means of addition or condensation reactions and, optionally, b) thereon, a layer of silicone that is crosslinkable by means of addition or condensation reactions.

DETAILED DESCRIPTION OF THE INVENTION

The adhesive strength of dental impression compositions on the impression tray is of a similar magnitude to the cohesive strength of the impression compositions themselves so that, when the impression tray is removed from the mouth, they adhere firmly to the tray.

According to a preferred embodiment, the moulding can be coated, on top of layer a), with a firmly adhering film of cured silicones (layer b) that still have sufficient reactivity to bond firmly to further curable silicone, for example silicone of the same reaction type as dental silicones.

For the dentist, the impression trays according to the invention represent a reliable and easy to use means of perfectly positioning and fixing the silicone impression material.

The mouldings according to the invention can be characterised in that, excluding layers a) and b), they consist of at least 95% by weight of at least one plastics material and/or at least one non-noble metal.

According to an embodiment, suitable moldings for coating and also, especially, impression trays for coating comprise, or consist of, plastics materials that can be partially dissolved by readily volatile, inert solvents, such as, for example, halogenated or non-halogenated aliphatic or aromatic hydrocarbons, ethers, ketones, esters or cyclic siloxanes. Suitable impression trays are, for example, those that have also already been used hitherto because of their strength properties and/or comprise polystyrene, polycarbonate, polymethacrylate, polyvinyl chloride, polysulphone, polymethylpentene, styreneacrylonitrile or mixtures thereof.

Alternatively, the moldings and, especially, the impression trays can comprise, or consist of, one or more non-noble metals, such as aluminum or steel. According to the invention, single-use impression trays that are suitable for use may therefore be, for example, impression trays that, excluding layers a) and b), consist of at least 95% by weight of inexpensive metals, such as, for example, aluminum or steel. The surfaces of moldings of that kind can be treated with, for example, alkoxy-, alkacetoxy-, vinyl- or methacrylo-silane, phosphoric acid, phosphonic acids, multi-functional carboxylic acids or also derivatives thereof.

According to the invention, moldings and impression trays are coated with, for example, copolymers (adhesion promoters, primers) that are crosslinkable by means of addition reactions, such as those described, for example, in Application DE 199 05 224 of S & C Polymer of Feb. 9, 1999 and in Application EP 94 304 825.6 of Tokuyama Corporation of Jul. 1, 1994 for addition-crosslinking systems. With respect to the copolymers that are crosslinkable by means of addition reactions, reference is expressly made to those Applications.

Adhesion promoters (A) of that kind for impression trays being coated for addition-crosslinking impression compositions can be present, for example, in the form of solutions of polymers that contain sufficient SiH or vinyl groups. The concentrations of the solutions are, preferably, from 0.1 to 20% by weight.

According to the invention, the moldings and impression trays can also be coated with copolymers (adhesion promoters, primers) that are crosslinkable by means of condensation reactions, such as those described, for example, in Application DE 199 15 492 of S & C Polymer of Apr. 17th 1999 for condensation-crosslinking systems. With respect to the copolymers that are crosslinkable by means of condensation reactions, reference is expressly made to that Application.

Adhesion promoters (C) of that kind for impression trays being coated for condensation-crosslinking impression compositions can be present, for example, in the form of solutions of polymers that contain sufficient silanol groups

wherein X=OH or corresponding readily hydrolysable esters or amides —O—Rc, —O—CO—Rc, —NRd—Rc, —NRd—CO—Rc. The concentrations of the solutions are, preferably, from 0.1 to 20% by weight.

In the case of moldings made of plastics, the dissolved polymers should preferably be able to dissolve in the plastics surface of the moldings sufficiently and/or partially dissolve the surface of the moldings sufficiently and bond to the surface. Special preference is given to the use of solvents that are sufficiently volatile, that is to say are volatile at temperatures of max. 100° C.

In the case of moldings according to the invention, layer a) comprises, according to a further embodiment, copolymers that are already crosslinked, at least partially, by means of an addition and/or condensation reaction.

The copolymers are, for example, copolymers that are obtained by copolymerisation of SiH-group-containing siloxanes with unsaturated compounds.

According to a further preferred embodiment, layer a) comprises copolymers having structural units, optionally repeating structural units, a) of the formula (I)

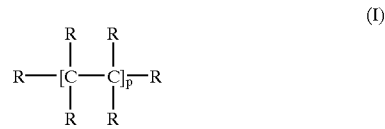

and
b) of the formula (II)

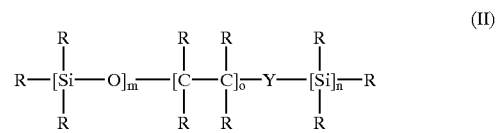

wherein
m and p are each independently of the other whole numbers >0,
n=1,
o=1 or 0,
Y is a bond or a group of the formula —CR$_2$— or —CO—O—CR$_2$—CR$_2$—CR$_2$—, each of the radicals R independently of the others is a H atom, an alkyl group, a group of the formula —CR'$_2$—OR', —OR', —COOR', —SiR$_c$R$_d$R$_e$, —NR$_d$—R$_c$, an organic acid radical, its anhydride or its corresponding readily hydrolysable ester of the formula —O —CO—R$_c$ or its corresponding readily hydrolysable amide of the formula —NR$_d$—CO—R$_c$, a phenyl group optionally substituted by one or two —CR'=CR'$_2$ groups, or a group of the formula —CR$_e$R$_f$CHR$_g$—SiX$_3$, a group of the formula—SiOSiO(SiO)$_m$H, an epoxy group, an aziridine group, a phosphate or phosphonate group or an anhydride thereof or a bond, or two radicals R together represent a group of the formula =CR$_2$, and each of the radicals R', RC$_c$' R$_d$, R$_e$, R$_f$, R$_g$ and X independently of the others may be a H atom, a —OH group, an alkyl group, an alkoxy group or an aryl group, with the proviso that in at least one unit of the formula II at least one radical R bonded to a Si atom is a —OH, —OR$_c$, —NR$_d$R$_c$, group or a radical of the formula —OCOR$_c$, —NR$_d$COR$_c$, n being 1, 2, 3 or 4.

After application of the adhesion promoters, the impression tray is optionally coated with a thin layer of silicone (layer b)) which is different to layer a), and cured.

The thicknesses of layers a) and b) may be, for example, from 0.001 to 5 mm, preferably from 0.1 to 1 mm.

The silicone of layer b) may comprise, or consist of, a low-viscosity vinyl silicone that is crosslinkable by means of an addition reaction or a low-viscosity silicone that is crosslinkable by means of a condensation reaction.

The silicone of layer b) may, in all embodiments, contain functional groups that are crosslinkable by means of an addition and/or condensation reaction, it being possible for the functional groups to be SiH or Si-vinyl groups and/or SiOH groups or hydrolysable derivatives thereof.

In the case of mouldings such as impression trays for addition-crosslinking impression compositions the tray may, after application of a copolymer primer (A), be coated with, for example, a low-viscosity addition-crosslinking silicone composition. After curing of the composition, the tray is ready to accept addition-crosslinking impression compositions, which adhere firmly to it after the cast has been taken.

In the case of impression trays for condensation-crosslinking impression compositions, the tray may, after application of a copolymer primer (C), be coated with, for example, a low-viscosity condensation-crosslinking silicone composition. After curing of the composition, the tray is ready to accept condensation-crosslinking impression compositions which adhere firmly to it after the cast has been taken.

If the impression trays according to the invention are to remain ready for use over a relatively long period, the coating must be formed in such a manner that, by reducing, or using an excess of, one of the components reacted with one another to produce layer a) and/or b), the reaction remains incomplete, despite the fact that the curing results in a solid film, so that sufficient curable groups (for example, Si—OH or Si—OR in the case of condensation-crosslinking systems and Si—H or Si—vinyl in the case of addition-crosslinking systems) also remain present for a relatively long period for the purpose of reacting with the casting material applied thereto.

Special preference is given to reducing one of the two or more individual components by about from 10 to 20% or adding a corresponding excess thereof over and above the mixing ratio specified by the manufacturer for using the materials in accordance with the instructions.

In principle, soft or hard silicone coatings may be suitable. Preference is given, however, to films having a Shore A hardness of from 5 to 50, special preference being given to Shore A hardnesses of from 10 to 30. Because good flowability of the as yet uncured silicone compositions is advantageous for a thin and uniform coating on the impression trays, especially suitable compositions are, for example, commercially available lining compositions or extra-free-flowing correction compositions for double impressions, which generally are in the preferred hardness ranges.

The impression trays according to the invention can be directly charged with impression composition of the appropriate hardness type at the dentist's and introduced into the mouth for the purpose of taking the impression. When the charged impression tray is taken out, the impression composition and the impression tray remain firmly bonded. Portions of the cured impression composition do not become detached from the impression tray; corresponding distortions and defective impressions do not occur. Attempts to remove the impression composition from the impression tray result in impression material breaking away.

The partial coating of impression trays can also result in sufficient adhesion of impression materials located on the impression trays.

Uses of the invention can also be advantageous in the industrial sphere. For example, pre-fabricated components coated or partially coated in accordance with the invention can be easily and irreversibly bonded with lasting flexibility by means of a mixture of curing silicones of the same reaction type.

EXAMPLES

Example 1
Production of a Coated Tray for Addition-crosslinking Impression Silicones An impression tray made of polycarbonate (Miratray—1400, Hager & Werken, Germany) is coated with a primer corresponding to Example 2 of Patent Application 1 99 05 224 of S & C Polymer of 9.2.99 and dried. The impression tray so treated is then immersed in a freshly mixed amount of lining composition Contour (Dentoflex, Germany) that has been mixed from 9 parts of component A (base) and 11 parts of component B (catalyst) (the normal mixing ratio is given as 1:1) and the resulting layer, which is about 0.5 mm thick, is allowed to cure. After 1, 4 and 8 weeks, using the tray without further treatment, a cast is taken with the addition-crosslinking silicone pre-impression composition R-si-line Putty (R-Dental, Germany). In all cases, the cast adheres firmly to the tray and can be removed only by destroying the impression composition.

Example 2
Production of a Coated Tray for Condensation-crosslinking Impression Silicones An impression tray made of polystyrene (Miratray, Hager Werken, Germany) is coated with a primer corresponding to Example 2 of Patent Application 1 99 15 492 of S & C Polymer of 7.4.99 and dried. The inner face of the impression tray so treated is then coated with a mixture of freshly mixed condensation-crosslinking correction silicone composition Xantopren VL (Kulzer, Germany), in which only 20% of the recommended amount of curing agent is used.

After 2 weeks, using the impression tray so treated, an impression is taken with the condensation-crosslinking silicone impression composition Optosil. After curing, the casting composition adheres extremely firmly to the impression tray, even when the silicone material projecting through the retaining holes in that commercially available impression tray has been removed beforehand.

What is claimed is:

1. A dental impression tray, comprising a layer (a) of copolymers that are crosslinkable by addition or condensation reactions, wherein said copolymers are obtained by (I) copolymerization of SiH-group-containing siloxanes with unsaturated compounds or by (II) copolymerisation of unsaturated compounds with subsequent reaction with SiH-Group- or vinyl-group- containing siloxanes.

2. The dental impression tray according to claim 1 wherein layer (a) comprises copolymers that are partially crosslinked by means of an addition and/or condensation reaction.

3. The dental impression tray according to claim 1 further comprising a layer (b) of silicone that is crosslinkable by means of addition or condensation reactions.

4. The dental impression tray according to claim 3 wherein excluding layers (a) and (b), the molding consists of at least 95% by weight of at least one plastics material or at least one non-noble metal, or a combination thereof.

5. The dental impression tray according to claim 4 wherein the plastics material can be partially dissolved by readily volatile, insert solvents.

6. The dental impression tray according to claim 4 wherein the plastics material is selected from polystyrene, polycarbonate, polymethacrylate, polymethylpentene or styreneacrylonitrile or a mixture thereof.

7. The dental impression tray according to claim 4 wherein the non-noble metal is selected form aluminum or steel.

8. The dental impression tray according to claim 7 wherein the non-noble metal has been surface-treated.

9. The dental impression tray according to claim 8, wherein the surface of the non-noble metal has been treated with alkoxy-, alkylacetoxy-, vinyl- or methacrylo-silane, phosphoric acid, phosphonic acids, or multi-functional carboxylic acids.

10. A dental impression tray comprising a layer of copolymers obtained by copolymerization of Si-H groups containing siloxanes with unsaturated compounds containing structural units, optionally repeating structural units a) of the formula (I)

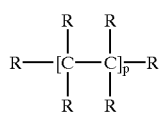

and b) of the formula (II)

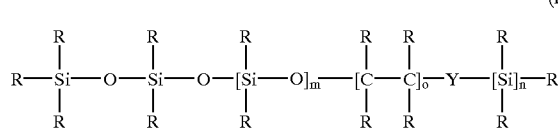

wherein
m and p are each independently of the other whole numbers >0,
n=1, 2, 3 or 4,
o=or 0,
Y is a bond or a group of the formula —CR$_2$—or —CO—O—CR$_2$—CR$_2$—CR$_2$—, each of the radicals R independently of each other is a H atom, an alkyl group, a group of the formula —CR'$_2$—OR', —OR', —COOR', —SiR$_c$R$_d$R$_e$, —NR$_d$—R$_e$, an organic acid radical, its anhydride or its corresponding readily hydrolizable ester of the formula —O—CO —R$_c$ or its corresponding readily hydrolizable amide of the formula —NR$_d$—CO—R$_e$, a phenyl group optionally substituted by one or two —CR'=CR'$_2$ groups, or a group of the formula —CR$_e$R$_f$CHR$_g$SiX$_3$, a group of the formula

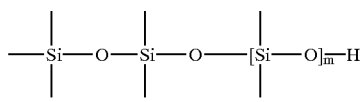

an epoxy group, an aziridine group, a phosphate group, a phosphonate group or an anhydride thereof or a bond, or two radicals R together represent a group of the formula =CR$_2$, and each of the readicals R', R$_c$, R$_d$, R$_e$, R$_f$, R$_g$ and X independently of the others may be an H atom, a —OH group, an alkyl group, an alkoxy group or an aryl group, with the proviso that in at least one unit of the formula II at least one radical R bonded to a Si atom is a —OH, —OR, NR$_d$R$_e$ group or a radical of the formula —OCORc, or —NR$_d$COR$_e$, n being 1, 2, 3 or 4.

11. The dental impression tray according to claim 10 further comprising a layer (b) which comprises at least one silicone that is crosslinkable by means of addition or condensation reactions.

12. The dental impression tray according to claim 11 wherein the silicone of layer (b) comprises a flowable vinyl silicone that is crosslinkable by means of an addition reaction or a silicone that is crosslinkable by means of a condensation reaction.

13. The dental impression tray according to claim 12 wherein the silicone of layer (b) contains functional groups that are crosslinkable by means of an addition and/or condensation reaction.

14. The dental impression tray according to claim 13 wherein the functional groups comprise Si—H, Si-vinyl, SiOH groups or hydrolysable derivatives thereof.

15. The dental impression tray according to claim 11 wherein the silicone layer (b) comprises an amount of vinyl silicone, hydrogen silicone, silicone having silanol groups

wherein X=OH or their corresponding readily hydrolysable esters or amides —O—R$_c$, —CO—R$_c$, NR$_d$—R$_c$ or NR$_d$—CO—R$_c$ which is in excess to the amount needed to react with the reactive groups of layer (a).

16. A method of producing a dental impression tray, comprising:
coating said impression tray with a layer (a) of copolymers that are crosslinkable by means of addition or condensation reactions.

17. A method of producing a dental impression tray of claim 16, further comprising applying a layer (b) of silicones that are crosslinkable by means of addition or condensation reactions thereon.

18. A method of producing a dental impression tray of claim 17 further comprising optionally reducing or increasing the relative amounts of a specified mixing ratio of at least one of either the copolymers or the silicones such that sufficient curable groups remain for reacting with a casting material applied thereto.

19. A method of producing the dental impression tray of claim 18 wherein the reducing or increasing the relative amounts of at least one of either copolymers or silicones results in a change in relative amount of about 0–20% from the specified mixing ratio.

20. A method of producing the dental impression tray of claim 17 wherein layer (b) has a Shore A hardness of from 5 to 50.

21. A method of producing the dental impression tray of claim 16 wherein the copolymers are in the form of solutions.

22. A method of producing the dental impression tray of claim 21 wherein the concentration of the copolymers in solution is from 0.1 to 20% weight.

* * * * *